(12) United States Patent
Kraft (10) Patent No.: US 7,813,540 B1
(45) Date of Patent: Oct. 12, 2010

(54) SYSTEM AND METHOD FOR DETECTING NUCLEAR MATERIAL IN SHIPPING CONTAINERS

(75) Inventor: Clifford H. Kraft, Naperville, IL (US)

(73) Assignee: Oro Grande Technologies LLC, Naperville, IL (US)

( * ) Notice: Subject to any disclaimer, the term of this patent is extended or adjusted under 35 U.S.C. 154(b) by 1260 days.

(21) Appl. No.: 11/034,498

(22) Filed: Jan. 13, 2005

(51) Int. Cl.
*G06K 9/00* (2006.01)
*G06K 9/62* (2006.01)
*G06K 9/46* (2006.01)
*G01N 23/04* (2006.01)

(52) U.S. Cl. .................. 382/143; 382/155; 382/156; 382/159; 382/181; 382/203; 378/57

(58) Field of Classification Search ............ 382/103, 382/141, 143, 155, 156, 159, 181, 191, 203, 382/204, 209, 224; 378/57
See application file for complete search history.

(56) References Cited

U.S. PATENT DOCUMENTS

| | | | |
|---|---|---|---|
| 4,430,568 A | 2/1984 | Yoshida et al. ............ 250/358.1 |
| 5,153,439 A * | 10/1992 | Gozani et al. ............ 250/390.04 |
| 5,247,561 A | 9/1993 | Kotowski ..................... 378/87 |
| 5,499,030 A | 3/1996 | Wicks et al. ................. 342/93 |
| 5,541,971 A | 7/1996 | Saito ............................ 378/15 |
| 5,559,845 A | 9/1996 | Strob ............................. 378/4 |
| 5,600,303 A * | 2/1997 | Husseiny et al. ......... 340/568.1 |
| 5,629,862 A | 5/1997 | Brandwajn et al. .......... 364/492 |
| 5,838,759 A * | 11/1998 | Armistead ..................... 378/57 |
| 6,069,696 A | 5/2000 | McQueen et al. ........... 356/326 |
| 6,370,222 B1 * | 4/2002 | Cornick, Jr. ................... 378/57 |
| 6,564,198 B1 | 5/2003 | Narayan et al. ............... 706/60 |
| 6,590,956 B2 | 7/2003 | Fenkart et al. ................ 378/57 |
| 6,661,867 B2 | 12/2003 | Mario et al. ................... 378/57 |
| 6,768,421 B1 * | 7/2004 | Alioto et al. ................ 340/600 |
| 6,965,314 B2 * | 11/2005 | Bohinc, Jr. ............. 340/539.26 |
| 7,015,475 B2 * | 3/2006 | Hailey ...................... 250/358.1 |
| 7,092,485 B2 * | 8/2006 | Kravis ......................... 378/57 |
| 7,116,235 B2 * | 10/2006 | Alioto et al. ................ 340/600 |
| 7,151,447 B1 * | 12/2006 | Willms et al. ............... 340/540 |

(Continued)

OTHER PUBLICATIONS

Muthukkumarasamy, Vallipuram, Michael Myer Blumenstein, Jun Hyung Jo, and Steven Green. "Intelligent Illicit Object Detection System for Enhanced Aviation Security." SEAL 04 and 2004 FIRA Robot World Congress. 1(2004): Print.*

(Continued)

*Primary Examiner*—Matthew C Bella
*Assistant Examiner*—Michael A Newman
(74) *Attorney, Agent, or Firm*—Clifford Kraft (57) ABSTRACT

A system and method for detecting metal contraband such as weapons related material in shipping containers where a container is scanned with at least one penetrating beam, preferably a tomographic x-ray beam, and at least one image is formed. The image can be analyzed by a pattern recognizer to find voids representing metal. The voids can be further classified with respect to their 2 or 3-dimensional geometric shapes. Container ID and contents or bill of lading information can be combined along with other parameters such as total container weight to allow a processor to generate a detection probability. The processor can use artificial intelligence methods to classify suspicious containers for manual inspection.

4 Claims, 5 Drawing Sheets

U.S. PATENT DOCUMENTS

| | | | |
|---|---|---|---|
| 2001/0036247 A1 | 11/2001 | Watanabe | 378/57 |
| 2003/0128804 A1 | 7/2003 | Poteet | 378/44 |
| 2003/0215054 A1 | 11/2003 | Fenkart | 378/57 |
| 2004/0017888 A1* | 1/2004 | Seppi et al. | 378/57 |
| 2004/0125914 A1 | 7/2004 | Kang | 378/57 |
| 2004/0141584 A1 | 7/2004 | Bernardi | 378/57 |
| 2004/0267412 A1* | 12/2004 | Arnouse | 701/2 |
| 2005/0058242 A1* | 3/2005 | Peschmann | 378/57 |
| 2005/0251397 A1* | 11/2005 | Zanovitch et al. | 705/1 |
| 2006/0098773 A1* | 5/2006 | Peschmann | 378/57 |

OTHER PUBLICATIONS

Singh, Maneesha, and Sameer Singh. "Image segmentation optimisation for X-ray images of airline luggage." Computational Intelligence for Homeland Security and Personal Safety, 2004. CIHSPS 2004. Proceedings of the 2004 IEEE International Conference on (2004): 10-17. Print.*

Blumenstein, et al. "Intelligent Illicit Object Detection System for Enhanced Aviation Security." SEAL 04 and 2004 FIRA Robot World Congress. 1(2004): Print.*

"High-Energy System Penetration" BIR Security—Before Oct. 20, 2004.

"Container Examination" Australian Customs—Before Sep. 16, 2004.

"Border Breach" Best of ABC News—Before Sep. 16, 2004.

"Cargo & Maritime Security" Holland & Knight—Before Sep. 16, 2004.

"Container Ships—The Next Terrorist Weapon?" Dave Eberhart, Newsmax Before Sep. 16, 2004.

"Guide to Nuclear Weapons" The Nuclear Weapons Archieve—Before May 1988.

* cited by examiner

TOMOGRAPHIC SLICES

SYSTEM AND METHOD FOR DETECTING NUCLEAR MATERIAL IN SHIPPING CONTAINERS

BACKGROUND

1. Field of the Invention

The present invention relates generally to a system and method for the detection of contraband and more particularly to a system and method for the detection of nuclear and related weapons material in shipping containers.

2. Description of the Prior Art

Every day, thousands of shipping containers enter the United States and other countries carried on large container ships. These containers are packed with goods in various foreign countries, loaded onto container ships and shipped into receiving ports in the US and elsewhere. According to one report, in the year 2002, more than 7500 commercial vessels made approximately 51,000 port calls offloading 6 million marine containers in U.S. Ports. Given the current climate, there exists a genuine fear that terrorists might smuggle nuclear material to make some sort of nuclear device or other weapon contraband in one or more of these containers.

It is well known that enough plutonium or enriched uranium to make a nuclear bomb fits in a relatively small space. It is also known that even smaller amounts of lesser enriched nuclear material could be used to make a so-called dirty bomb. The estimated amount of plutonium needed for an implosion device is around 25-30 kg; the amount of enriched uranium needed for a simple cannon device is around 40-60 kg (See Wikipedia Free Encyclopedia on the Internet). It is difficult to detect such small amounts of these materials.

At the present time, only cursory checks are made on containers coming off ships in the U.S. In fact, the U.S. government admits that, at the present time, only about 2% of the marine containers entering the country is checked. For example, in 2003 ABC News loaded 15 pounds (about 7.5 kg) of depleted uranium into a steel pipe which was packed in a suitcase in Jakarta. They put the suitcase into a teak trunk along with other furniture and shipped it to the U.S. in a marine shipping container. The uranium was never detected and successfully entered the U.S. Had this shipment contained enriched uranium or plutonium, the recipient would have had about $\frac{1}{3}$ to $\frac{1}{5}$ of the material needed to make a weapon Various techniques have been developed in the prior art to "look inside" marine and other shipping containers. In particular x-ray machines and gamma ray detectors have been proposed, and also used, for checking containers. In Australia, customs officials report that they are currently x-raying approximately 80,000 containers a year. X-raying of baggage and hand-carry items at airports worldwide has become commonplace. U.S. Pat. No. 4,430,568 shows an early version of this type of x-ray system, while U.S. Pat. No. 5,247,561 shows an inspection system for closed containers. U.S. Pat. No. 6,661,867 shows a tomographic scanning x-ray inspection system, and U.S. published patent applications 2003/0215054 and 2004/0141584 show larger systems. These prior art systems cannot positively identify nuclear material with a high probability (or heavy lead or steel containers) and cannot generally correlate x-ray patterns with any other type of information.

It has also been reported that bills of lading and contents lists for containers are not always correct as to container contents, and that reported container count for a particular ship is not always correct. A container scanning system that can correlate and combine information from x-ray, gamma ray or other pattern detection with container tag information, imperfect bills of lading and content lists and any other available intelligence that might be available would be advantageous.

SUMMARY OF THE INVENTION

The present invention relates to a system and method for detecting metal contraband material in shipping containers such as nuclear material using a detector that can produce an output signal that can be a function of time as the detector scans a shipping container. The system can contain a signal processor that receives the output signal to produce tomographic 2-dimensional or 3-dimensional images of the contents of the container across various axes or other types of images. The processor can contain a pattern recognition subsystem that produces a pattern recognition record for the images. The pattern recognizer can classify patterns based on void size and geometric shapes of interest. A further processing subsystem can optionally compare a container ID with a bill of lading or contents list for the particular shipping container to generate a set of parameters concerning the expected contents of the container as well as combine other available information about the container. Finally an analysis system can compare the pattern recognition record with the set of parameters concerning expected content to produce an event detection probability for the container.

The processing subsystem can produce a total metal content estimate for the shipping container as well as a detection probability. This can be done directly from pattern classification, or the further parameters concerning expected contents along with other information can be used as well. The system can use artificial intelligence decision techniques including rule-based decision making and expert systems.

Several illustrations and figures have been presented to aid in the understanding of the present invention. The scope of the present invention is not limited to the figures.

DESCRIPTION OF THE INVENTION

The present invention relates to a system and method for finding hidden nuclear material, related weapon parts or other metal contraband in shipping containers. Nuclear material and other related weapons material (other than explosives per se) generally contains heavy and dense metals such as plutonium, uranium, steel, lead and beryllium (even though beryllium has a low atomic weight, it is very dense). In general these metals are detectable using x-ray techniques. Radioactive materials such as uranium, plutonium and polonium can also sometimes be detected with radiation detectors, or by exciting the material with a neutron beam and then measuring an enhanced neutron signature. The success of these procedures depends on whether the radioactive material is shielded or not.

Figure 1:
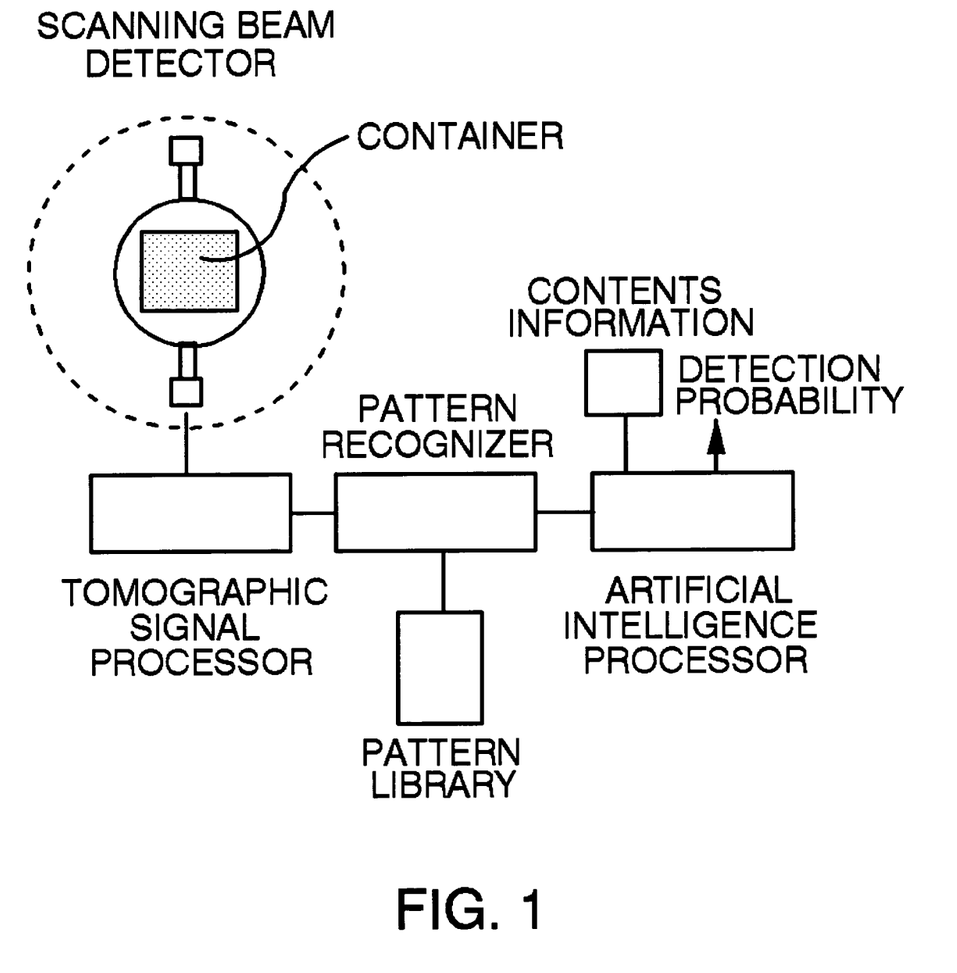
FIG. 1 shows a block diagram of an embodiment of the present invention.

Embodiments of the present invention can contain a scanning x-ray device, preferably with tomographic capability, output signal processing, pattern recognition and detection probability generation. Turning to FIG. 1, a block diagram of such an embodiment is shown. A rotating tomographic scanning x-ray boom circulates around the longitudinal axis of a container as the container is moved through the device in this direction. The resulting continuous or discrete time signals can be converted to 2-dimensional slice information along various axes using known tomographic techniques by a tomographic signal processor. Various of these 2-dimensional images can be fed to a pattern recognizer where certain predetermined or pre-learned patterns can be searched for usually based on a pattern library. The scanner can optionally scan simultaneously or separately at two or more different x-ray energies to produce images with different penetration depths thereby distinguishing different materials. Optionally, the scan energy of the scanner can be changed dynamically while scanning.

Analysis of 2-dimensional slice images can result in positive pattern recognitions. This information, as well as location within the container of the detected pattern, reliability estimate of the pattern detection, and other parameters can be handed to a computing engine such as an artificial intelligence processor that can combine various computing and artificial intelligence techniques. Detection information can be combined at this point with input information from bills of lading, contents lists, or any other available information (including intelligence information about possible suspected shipments). The artificial intelligence computer can output a detection or "hit" probability, or other signal, that a particular container might contain suspicious material and should be opened and searched. Detection thresholds can optionally be set to adjust the total sensitivity of the system.

Scanning Detector

A first component of the present invention generally is a scanning detector that produces image signals. Such a detector is used to scan a container from the outside. A successful material detector may combine one or more of the detection methods discussed (such as x-ray, gamma ray, direct radiation detection, neutron beams, etc.). X-ray detection seems particularly attractive because it is technically easier to engineer, somewhat cheaper, and can be used in a scanning or tomographic mode (CT-scan). A tomographic mode involves the use of a beam transmitter and receiver that are placed in a generally linear relationship with each other and then usually caused to rotate around a target while maintaining that linear relationship (for example on the ends of a boom). The output signal from the receiver is normally a continuous function of time that results as the target moves through the rotating detector. The final beam path through the target is a helix or spiral. The time-continuous output signal function can be processed using known techniques to produce a series of 2-dimensional slices through the target in planes related to many different axes. U.S. Pat. No. 6,590,956 shows a large CT-scanner that can be used to scan items such as luggage. U.S. Pat. No. 6,590,956 is hereby incorporated by reference.

Figure 2:
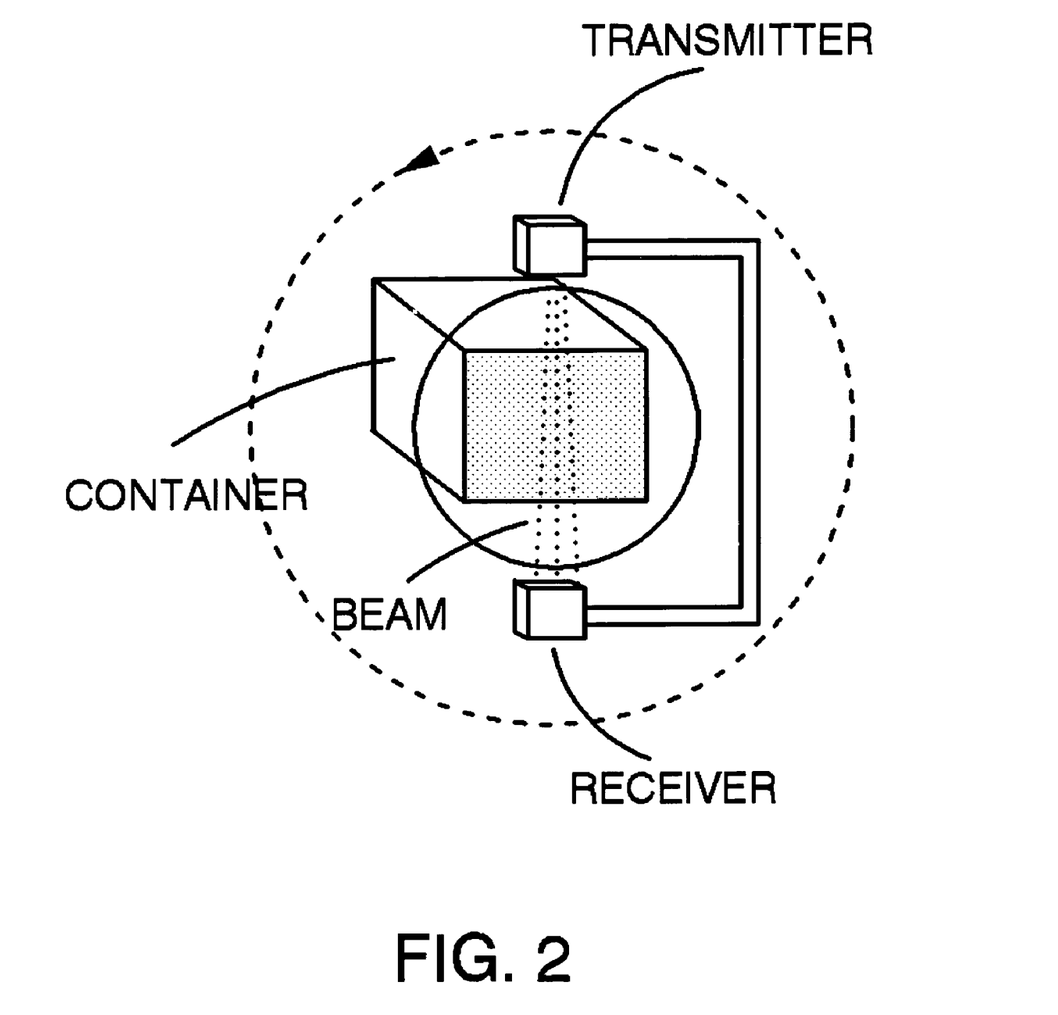
FIG. 2 shows a tomographic scanner for scanning containers in a port.

A tomographic scanner used in the present invention usually has characteristics that are somewhat different than luggage scanners: 1) it generally should be physically large enough to handle shipping containers, and 2) it should use a high enough energy beam to penetrate the container walls, but low enough to detect small concentrations of heavier metals such as steel, uranium or plutonium. The beam should also present a shadow outline of larger metal objects such as aluminum artillery or bomb shells, and shadows of objects such as a beryllium shield. An embodiment of such a device is shown in FIG. 2. A transmitter and receiver are located in opposing positions on a boom that rotates around the container. The beam scans the container as the container moves linearly through the device.

Pass-through efficiency is a major concern for a system such as that illustrated in FIG. 2. As containers are unloaded from ships, they are normally moved by rail, truck or by other means to their final destinations. In many ports, containers are directly loaded from ships to rail flat-cars or from ships to truck beds. This direct loading of the final transportation vehicle allows a port to operate at high efficiency. The present invention allows the same or a similar loading method to be used; however, before the railcar or truck leaves the port with containers, it passes through the scanner. The present invention allows the scanning head to rotate at a high RPM so that the vehicle carrying the container can pass through the scanner fairly rapidly. To maintain maximum efficiency, most ports will probably require several scanners arranged so that leaving vehicles can enter them in parallel (similar to toll gates). This prevents a loss of efficiency of the port operation.

The faster the unit shown in FIG. 2 can scan, the faster the container can be taken through the scanner. Therefore, it would be desirable to rotate the boom at as high a rate as possible. The limit on the RPM of a scanning boom such as that shown in FIG. 2 (and hence the maximum linear rate through the scanner) is determined by the linear velocity of the outer most part of the rotating head. It is well known that it is not feasible to rotate a mechanical apparatus at an RPM where the linear velocity of the outermost part of the structure approaches or exceeds the speed of sound. This is true because of the tremendous increase in drag as the speed of sound is approached. At subsonic speeds, drag is approximately proportional to linear velocity. As the speed of sound is approached, drag increases dramatically due to the generation of a shock wave.

The following example shows how to estimate possible scanning speed. Most shipping containers are around 10 feet by 10 feet by 10-40 feet. Thus a typical cross-sectional diagonal is around 14 feet. To avoid the need for critical centering, a scanning apparatus diameter should be at least 15 feet measured from transmitter to receiver. This leads to a maximum radius of around 7.5 feet for a rotating boom. The speed of sound is approximately 1000 feet/sec. Using an estimate of around 900 linear feet/sec for the outermost parts of the structure, the maximum RPM is around 120 RPM or 2 revolutions per second. To minimize drag, the transmitter and receiver should of course be streamlined. Assuming that a rotation rate of 120 RPM can be sustained, the maximum linear scan rate of the system can be computed.

A critical factor in scan rate is scan resolution. For a typical scanner length resolution, it is desirable to not have axial gaps larger than about 2-3 inches. For example, a cube of uranium weighing 10 kg (19050 kg/m3) would have a side length of around 8 cm or around 3 inches. Contraband fissile material would most probably be shipped separated pieces or parts, probably in heavily shielded containers (i.e. lead cans, etc.— both to avoid detection and unwanted fission). At 2 revolution per second, to achieve a 2 inch resolution, the container could pass through the apparatus at a linear rate of around 4 inches per second or 20 feet per minute. This would allow scanning a 10 foot container in ½ minute and a 40 foot container in 2 minutes. This could be speeded up somewhat by scanning slightly faster, or resolution could be increased by moving the container slower. The final beam resolution also depends on beam focusing, beam photon energy, and beam amplitude (number of photons per second).

The scanner of FIG. 2 is a rotating tomographic x-ray scanner where containers pass through a shielded tunnel with a rotating concentric opposed transmitter/receiver. The containers can be driven through the apparatus on trucks or railcars or pulled through. The preferred method to operate a port is to load the containers onto sleds directly from incoming ships, pull the sleds through the apparatus and then load trucks or railcars at the output of the scanning apparatus. An alternate method could be to load the containers on trucks or railcars and then drive or pull the truck or railcar through the apparatus with the container(s) loaded. This is physically harder to realize because of the possible larger size of circular scan needed to fit around a truck or railcar. In addition, possibly higher energy beams might be needed to penetrate the bottom of structures like a railcar. Alternate linear up/down scanning or the like can be used rather than rotating tomographic scanning; however, this results in lower resolution images and considerably more difficulty constructing slice or cut type images. Any detection or scanning method whether is within the scope of the present invention.

Penetration is a problem that a scanning system such as that shown in FIG. 2 should solve. The scanning beam of x-rays, neutrons, electrons or any other type of scanning mechanism generally must have enough energy to penetrate the outer skin of a container and yet clearly show up regions of target metals inside the container. It is known in the art that beam photon energies of between 0.5 MeV and 9 MeV are optimum. X-rays of these energies are usually generated by linear accelerators. In general, a 3 MeV beam can penetrate about 11 inches of steel, while a 9 MeV beam can penetrate 16 inches of steel. Softer beams (lower energy) can be used for scans of parts of the container near the surface. In addition to sufficient beam energy, the beam should also have sufficient amplitude to create a reasonable signal to noise ration at the receiver. A 10 dB or greater signal to noise ratio at the receiver is usually sufficient.

It is also known in the art to detect neutrons and gamma rays generated from x-ray or neutron beam interaction with fissile material during x-ray scans. The problem with this is that if the contraband material is in a shielded container, or is not radioactive, there will be very little such emissions. Therefore, the preferred scanning method of the present invention is a rotating tomographic x-ray of energy between around 0.5-9 MeV. Parallel image processing can proceed as the scan progresses so that many preliminary topographic slices are available before the container completes its linear course through the scanner. To solve the penetration problem, scans can be made with different energy beams of the same region. This is particularly important considering that an adversary might try to fool a pattern recognizer by hiding contraband material inside a shell shaped like a machine or other innocent shape. For this reason, the primary x-ray scanner should be able to increase energy to where it can penetrate most machine parts. At this higher energy setting, the scanner can produce topographic images of any regular shaped objects that might be stored in physical voids in a larger machine. To accomplish this, and avoid a re-scan, one embodiment of the present invention allows two or more separate x-ray units on the rotating scanner. One of these could scan at a lower energy (such as around 0.5-3 MeV), and the other could run at a higher energy (such as 9 MeV or above). These units could then produce parallel outputs that would pass through the tomographic and signal processors and into the pattern recognizer.

Pattern Recognition

After scanning, the system should find, patterns in the images. The sets of topographic images created by a beam scanner should be analyzed using pattern recognition techniques. The object generally is to find suspicious shapes. The best techniques known in the art are machine vision methods that use neural networks (or other learning or adaptive networks) as pattern learning devices and fuzzy logic to make "soft" decisions. By the term "soft" decision, I mean a decision that is based on statistical quantities known in fuzzy logic systems. McQueen et al. in U.S. Pat. No. 6,069,696 teach object recognition of 3-dimensional forms at a point of sale terminal. Narayan et al. in U.S. Pat. No. 6,564,198 teach the use of a fuzzy expert system for rule extraction from a neural network. These patents are typical of pattern recognizers known in the art. U.S. Pat. Nos. 6,069,696 and 6,564,198 are hereby incorporated by reference.

Normally, a pattern recognition system will be required to produce a list of potential hits, where a hit is some part of an image or group of images that generates a large output response from the pattern recognizer. To refine this technique, a pattern recognizer may need to re-order and re-slice the images along different axes. This is simply a repeat of the tomographic algorithm. A sophisticated pattern recognizer may require several different shuffles of the tomographic data before assigning final hit probabilities for an entire container. While the preferred pattern recognizers are neural networks coupled with fuzzy logic, any pattern recognizer or pattern recognition technique is within the scope of the present invention.

The pattern recognizer is primarily searching for x-ray voids caused by the presence of metals. However, voids shaped like machinery should not cause as high a hit probability as rectangular, circular or regular geometric shapes. A primary job of a pattern recognizer should be to first detect all x-ray voids at low energy, and then sort them based on shapes in 3-dimensions (generally using 2-dimensional slices possible at higher energy). The recognizer should output guesses or estimates as well as detections and threshold crossings. In other words, when a heavy machine is encountered, the output should relate that a large void was detected and it was shape-classified to be a machine. Higher energy scan data can be analyzed for internal structure or contents. A later checking of the bill of lading or contents list can be made to see if machines were being shipped. A good pattern recognizer should classify all, or almost all, void shapes encountered; however, classification should be "soft" to allow for later statistical decisions and corrections by an artificial intelligence system.

Most pattern recognizers require learning or at least the presence of reference patterns to classify against. The pattern recognizer system of the present invention can work against libraries of suspicious shapes. This library should contain the known shapes of weapon components including spheres, cylinders, cubes or wedges, and cannon type objects such as tubes with thick walls. The library can also contain known or postulated shapes of items like shields plugs, neutron actuators (such as polonium plugs or cylinders). The easiest to detonate nuclear device would be a cannon using enriched uranium. It is also possible that an implosion device could be purchased or otherwise obtained from some country that had the level of sophistication in technology to produce it. In this case, the target shapes could be spherical, especially concentric spheres, parts of spheres. The explosive lens blanket of such a device might be shipped as pieces and could be much more difficult to detect. Target shapes should include explosive lens shapes and also shapes of typical high voltage capacitors, thermal batteries, etc. needed to detonate such a system. Any type of metal sphere should be questioned because in addition to plutonium parts spheres may be used for pressure vessel gas bottles for weapons use. In addition, small pellets should raise suspicion. Any container with a large number of identical metal pieces should receive a higher recognition probability, no matter what their shape. All such shapes should be contained in the shape library.

In any such system as the present invention, there should be a decision in the pattern recognition strategy whether to search for electronic devices or not. Even though a sophisticated weapon needs considerable electronic support, there are so many innocent electronic devices shipped (especially from Asia) that searching for electronics on the basis of pattern recognition becomes next to impossible. While the scope of the present invention includes searching for electronic shapes, the preferred method is to ignore electronics completely (needle in the haystack problem).

Figure 3:
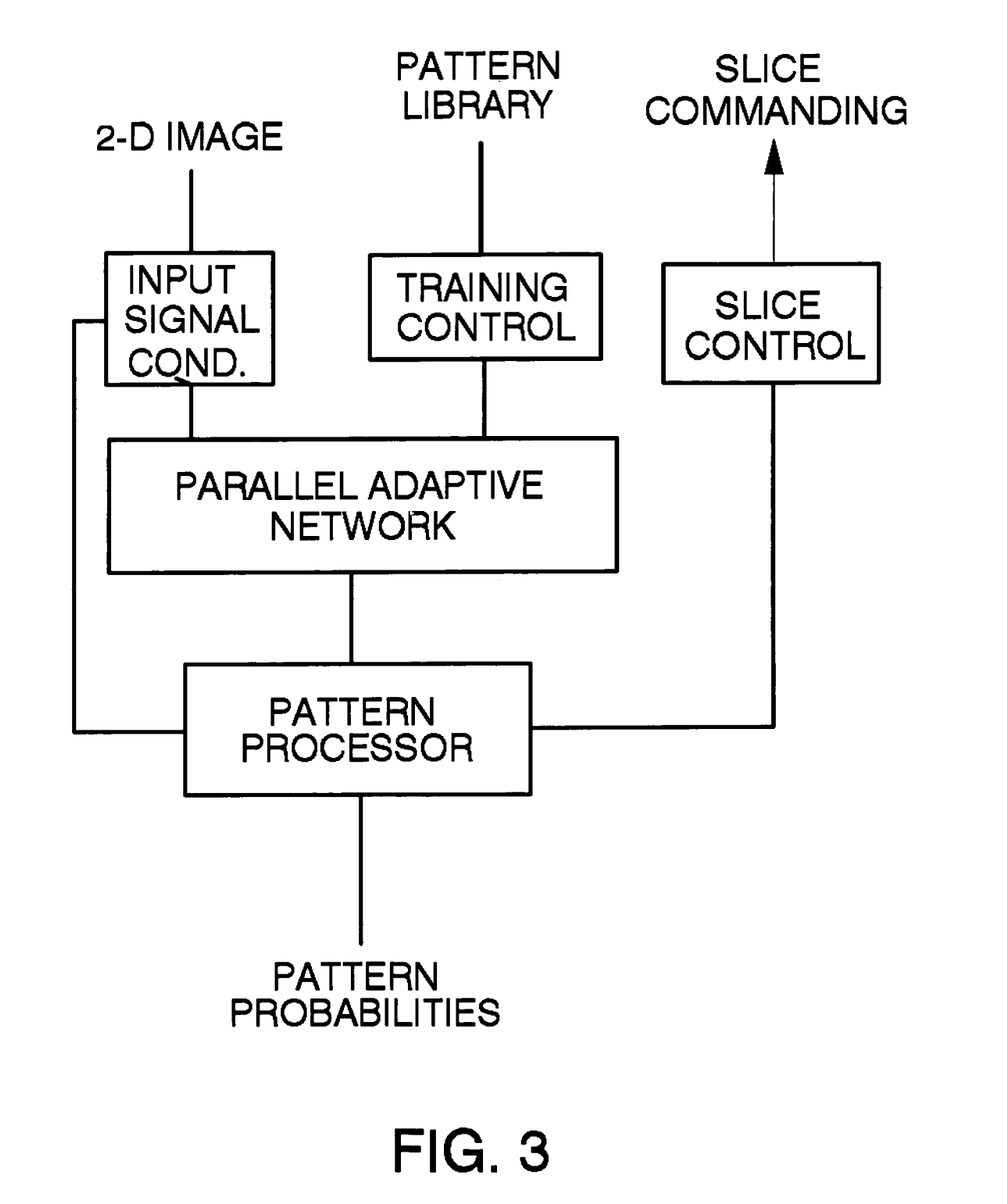
FIG. 3 shows a block diagram of a pattern recognizer.

An example of a pattern recognizer can be seen in FIG. 3. Here 2-dimensional images (slices) are handed to a parallel adaptive network or other pattern recognizer through various optional input signal conditioners known in the art. The parallel adaptive network can be a neural network, learning network, or any other type of pattern recognition network or algorithm. In particular, this "network" can be realized by software running in a special or general purpose computer. Patterns from a pattern library can be trained into the network or simply used as reference models. A pattern processor or controller evaluates outputs from the recognition engine or parallel adaptive network to decide if there are any "hits" or recognitions of importance. It may be necessary to re-slice the 3-dimensional space of the container along a different axis in order to make a decision. A slice-controller can optionally request different slice data from the original scan data from the same container from the tomographic processor.

The pattern processor in FIG. 3 generally can perform the following typical tasks, among many others:
1. Locate scan voids in a 2-dimensional cross-section.
2. Cause the image to be zoomed into the void.
3. Examine the same slice at different scan energies.
4. Cause the parallel adaptive network or recognizer engine to attempt to match suspect patterns.
5. Classify recognitions.
6. Request slices along different axes if needed.
7. Output recognition probabilities and coordinates for further processing.

The embodiment of a pattern recognizer shown in FIG. 3 has been presented to better aid in the understanding of the present invention. Any type or method of pattern recognition is within the scope of the present invention.

Artificial Intelligence

Figure 4:
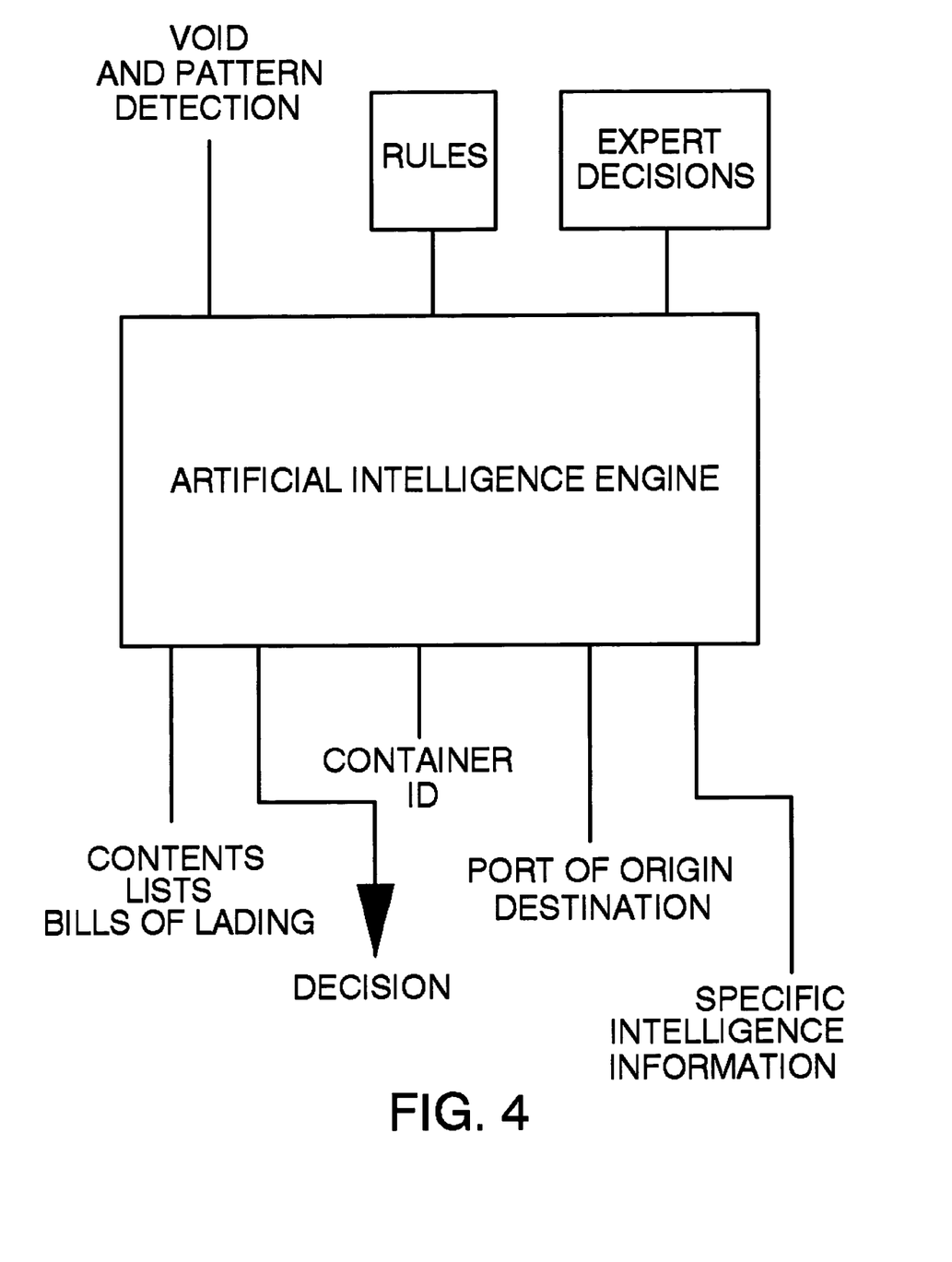
FIG. 4 shows a block diagram of an artificial intelligence system.

The next problem solved by the present invention can be that of artificial intelligence in flagging those containers that should be searched manually. If a particular container receives a hit probability that exceeds a predetermined threshold based on pattern recognition, the bill of lading or container contents list can next be automatically checked. If the list does not show any item that could be classified as a matching pattern for a discovered void, the container can be immediately sidetracked for manual inspection. The bill of lading or contents list can be electronically coded by the heaviest material in the container. Thus, wood furniture might be coded with a low value, metal folding chairs slightly higher, bronze statues higher, and heavy machinery very high, etc. Many of the items shipped into U.S. (and other countries) are not heavy machinery and are not made of heavy metal. Therefore, any heavy metal detections should be immediately suspect—usually requiring further verification by the bill of lading or contents list, even if there is no high probability pattern recognition hit. Patterns containing many small heavy metal pieces (possibly scattered throughout a crate, or even throughout an entire container) should receive a very high hit probability even without a shape recognition since this is one way contraband nuclear material might be shipped. FIG. 4 shows an example block diagram of an artificial intelligence decision system.

Brandwajn et al. in U.S. Pat. No. 5,629,862 teach a rule-based procedure for the selection of contingencies in evaluating the dynamic security of a power distribution system. Wicks et al. in U.S. Pat. No. 5,499,020 teach an expert system constant false alarm rate processor. These patents are typical of rule-based and expert systems known in the art. U.S. Pat. Nos. 5,629,862 and 5,499,020 are hereby incorporated by reference.

A rule-driven system, expert system, or both (or any other artificial intelligence or decision method) forms an artificial intelligence engine. This decision engine takes data on void location, size, density, and shape, and any pattern recognition that was made and combines it with contents information from a bill of lading or contents list. In addition, container ID, port of origin, destination, and any other information that is available can be combined with pattern and void information to form a final weighted decision as to whether the container should be passed without inspection, or whether it should be stopped for opening and manual physical inspection. In addition, for any stopped container, the system shown in FIG. 4 can provide information of where in the container to look (coordinates of patterns, etc.). In particular, the system shown in FIG. 4 should be able to use any extra or a priori intelligence information that is available and combine it with other information (such as information from sources like the FBI, CIA, Interpol, Homeland Security, etc.). Decisions can be fuzzy and be presented as probabilities. These decisions levels can be compared with internal thresholds set by the port administration or security. The ultimate value of thresholds controls the average physical inspection rate. Thresholds can be lowered in emergency situations when the probability of events or general security is higher. Thresholds can be raised if too many containers are being physically searched for port security personnel capacity. The embodiment of an artificial intelligence system shown in FIG. 4 is presented to aid in understanding of the present invention. Many other artificial intelligence or decision methods can be used. Any decision method is within the scope of the present invention.

In a particular embodiment of the present invention, a rule-based system might be used. Various detection rules are possible in a such a rule-based system. The following is an example of a possible subset of rules:
1) If detected large void, and contents list shows no metal—raise probability;
2) if detected large void with no inner structure, and contents list shows machinery—lower probability;
3) if detected large void with inner structure—raise probability; if inner structure is critical shape—raise probability higher yet regardless of contents list;
4) if detected critical shape—raise probability; if contents list does not indicate items that could have this shape—raise probability more;
5) if detected numerous small metal pieces—raise probability; and if most same shape—raise probability more; and contents list does not show anything that contains small metal parts raise probability more;

6) if a priori intelligence indicates that a shipment of uranium pellets is planned; detected numerous small metal objects of random shape—raise probability considerably; if contents list contains nothing to account for these shapes, raise probability higher yet;

It is possible to devise many more rules of this sort. Most rule-based systems contain thousands of rules. These rules are provided simply as an example to aid in the understanding of the present invention. Any detection rules of any type are within the scope of the present invention. The present invention allows the combination of a rule-based system with expert systems or any other combination of artificial intelligence algorithms.

Additional Considerations

In addition to simply basing a decision on x-ray voids and simple geometric shapes, the final decision algorithm should also attempt to quantify the total amount of heavy metal in a particular container. The algorithm can then try to make a computation of the expected amount of heavy metal with an estimated expected amount based on the bill of lading, contents list, or other shipping records. If the detected amount is very different from the estimated amount, the hit probability should be significantly raised. Also, if there is a significant amount of metal in a particular container, and the contents list is very sketchy (or non-existent), the container should immediately be classified as suspicious.

As stated above, in addition to a raw hit probability, the system of the present invention can give security personnel hints on what to look for and where to look. For example, the system could report that there was a recognition of 4 small regularly shaped heavy metal items (cylinders) in a container that did not match the bill of lading or contents list. In addition, the system could give the 3-dimensional coordinates of the shapes in the container to aid in finding them (front ⅓ of container, toward left side, near floor).

The ABC news trial previously discussed shipped 15 pounds (about 7.5 kg) of depleted uranium in a steel pipe. Since steel pipes are effective at shielding, might be normally shipped as regular cargo, and are easy to obtain, load and unload, they might be used instead of lead. Pipes are easily detected by the system of the present invention. In addition, the high energy beam of the present invention can penetrate a steel pipe revealing any heavier contents inside the pipe. For this reason, a high hit probability should be assigned to any metal system that seems to have metal inside of metal, and a high hit probability to containers containing pipes of any type. An exception to this might be the case of a container filed with pipes (a pipe shipment). In this case, the bill of lading or contents list might list the contents as steel pipes, etc. Here, the simple detection of pipes alone should probably not raise the hit probability much. The detection algorithm should instead concentrate on scanning through the pipes looking for content inside a one or more pipes.

In a well managed shipping system or port, every container would have an ID. Either a number on its exterior, RFID tag, or some other type of identifier. This ID should relate to a bill of lading or contents list. However, as noted previously, many containers do not have correct bills of lading (or any for that matter), and some containers do not have unique IDs (they may just have a designator for a particular shipping company). These problems can be cured by administrative means; however, the system of the present invention can cope with them by assuming that a given container might not have a valid ID; it might not have a good bill of lading or contents list, and it may not be a standard size or weight.

The present invention can classify containers immediately into those with good "paperwork", i.e. a positive ID, point of origination and point of destination, and a good bill of lading/contents list, and those with inadequate "paperwork", where one or more of these items is deficient. Containers without good "paperwork" should immediately be classified with a higher base hit probability then those with good "paperwork". Such rogue containers can be scanned slower and more intensely since there is a higher intrinsic probability that they might contain something of interest. The totality of information about a container (other than scan information) can be called "container information".

The present invention allows the use of artificial intelligence including rule-based systems and expert systems to sort and classify all available search parameters and to produce a final hit probability or a final decision on whether the container should be detained and manually inspected. The particular parameters have been discussed and include, the amount of metal in the container, positive heavy metal recognitions, positive geometric shape metal recognitions, agreement with contents lists, quality of the ID and other parameters.

Figure 5A:
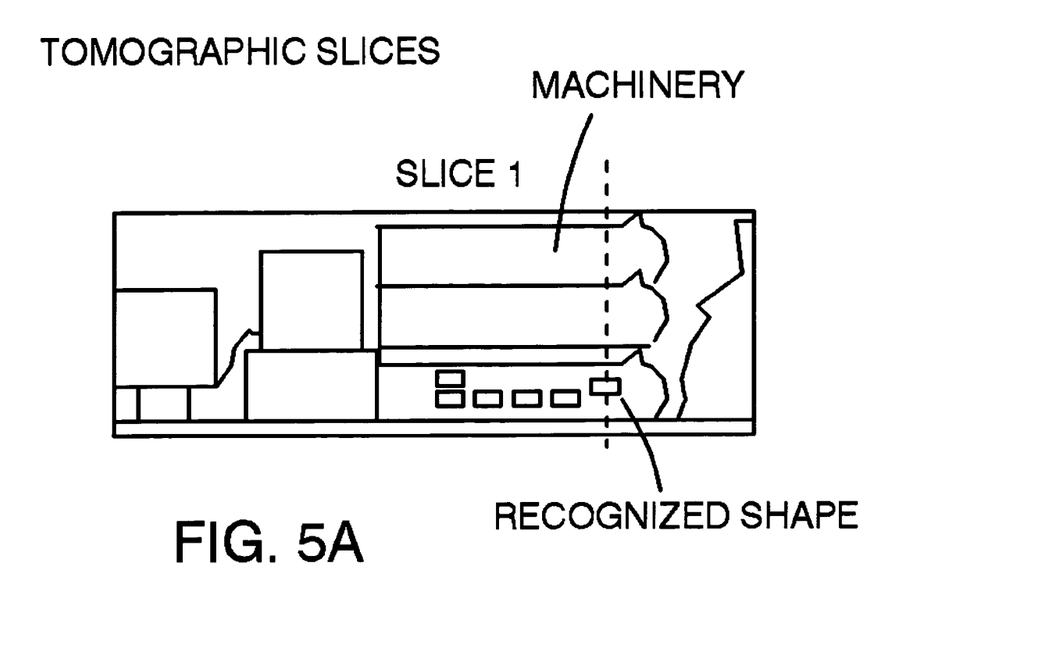
FIGS. 5A-5B show 2-dimensional image slices of a container with contraband along two slice axes.
Figure 5B:
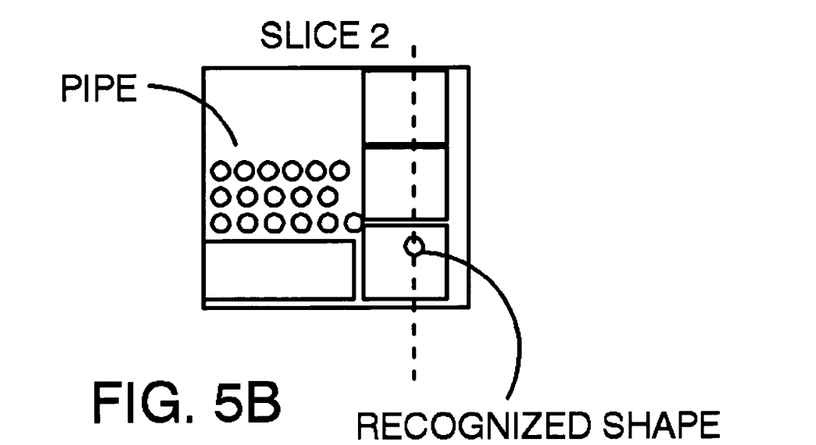

FIGS. 5A-5B show a representation of a container with some heavy metal machinery and some contraband cylinders hidden within the machinery. FIG. 5A represents one cross-sectional slice taken sideways into the container. FIG. 5B shows an axial slice showing that what look like small rectangles in FIG. 5A are really cylinders. This type of cross-pattern correlation using different slices optionally presents very good raw information into an artificial intelligence decision maker engine or algorithm. In this case, the pattern recognizer would report the presence of sold small metal cylinders. FIGS. 5A-5B also show the advantage of using tomographic slices with possible variable penetration as opposed to straight-through sideways x-ray. The pieces of pipe seen endwise in FIG. 5B cannot be seen in the slice of FIG. 5A because they are behind the slice plane (they would appear sideways in a different slice plane further back). Conventional x-ray, on the other hand, produces 2-dimensional images that pile objects from all depths on top of each other which is not as convenient or reliable as slicing tomography.

A detailed description and several illustrations have been presented to better aid in the understanding of the present invention. It will be recognized by one skilled in the art that many changes and variations are possible. The scope of the present invention includes all of these changes and variations.

I claim:

1. A method for scanning shipping containers for nuclear material comprising:

scanning a shipping container with a rotating CT-based x-ray device producing CT scan data as said shipping container moves through a scan area;

slicing said scan data into a sequence of 2-dimensional slices;

locating nuclear weapon component target shapes in said 2-dimensional slices including spheres, cylinders, cannon barrels or pellets, using pattern classification techniques;

re-slicing said scan data along at least two different axes to verify said possible shapes;

outputting scan recognition signals to an artificial intelligence processor relating to detection of any of said nuclear weapon component target shapes in a particular container;

comparing at said artificial intelligence processor said scan recognition signals with data such as a bill of lading container content lists, port of origin data or container weight to produce an event probability number;

quantifying a total metal content for said container;

raising said event probability number when a contents list for said container does not show a total metal content compatible with the total metal content for the container;

outputting a risk alarm from any container having an event probability greater than a predetermined value.

2. The method of claim 1 further comprising:
locating voids in said 2-dimensional slices;
examining said voids along different slice axes;
examining said voids with different x-ray energies.

3. The method of claim 1 further comprising raising said event probability number when a container is determined to contain a plurality of small metal parts.

4. The method of claim 1 further comprising raising said event probability when said container contains pipes-shaped objects.

* * * * *